(12) United States Patent
Jennings et al.

(10) Patent No.: US 6,804,230 B1
(45) Date of Patent: Oct. 12, 2004

(54) COMMUNICATION DEVICE WITH FORWARDING DATABASE HAVING A TRIE SEARCH FACILITY

(75) Inventors: Kevin Jennings, Dublin (IE); Edele O'Malley, Dublin (IE); Sorcha O'Callaghan, Dublin (IE); Kevin Loughran, Dublin (IE)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/432,591

(22) Filed: Nov. 3, 1999

(30) Foreign Application Priority Data

May 26, 1999 (GB) ............................................. 9912129

(51) Int. Cl.[7] ......................... G06F 17/30; H04L 12/54
(52) U.S. Cl. ...................... 370/388; 370/389; 370/428; 707/3
(58) Field of Search ............................... 370/389, 392, 370/395, 386, 388, 428, 351; 707/3

(56) References Cited

U.S. PATENT DOCUMENTS 5,787,430 A * 7/1998 Doeringer et al. .......... 707/100
5,790,979 A * 8/1998 Liedtke ...................... 711/206
5,909,440 A * 6/1999 Ferguson et al. ............ 370/389
5,983,320 A * 11/1999 Farmwald et al. ........... 711/114
6,014,659 A * 1/2000 Wilkinson, III et al. ......... 707/3
6,430,527 B1 * 8/2002 Waters et al. .................. 703/3
6,493,347 B2 * 12/2002 Sindhu et al. .............. 370/401

FOREIGN PATENT DOCUMENTS

| EP | 0551243 A2 | 1/1993 |
| WO | WO 95/34155 | 12/1995 |
| WO | WO 99/13619 | 3/1999 |

* cited by examiner

Primary Examiner—Steven Nguyen
Assistant Examiner—Roberta Stevens
(74) Attorney, Agent, or Firm—Nixon & Vanderhye, PC

(57) ABSTRACT

A communication device which includes a hardware trie search facility. At least part of a memory is divided into memory blocks, each of said blocks consisting of a multiplicity of locations, at least some of said locations each providing when accessed a pointer to another block and an indication of the size of the block. A shift register holds an address key, and a trie block is accessed using an address composed of a number of bits related to said indication of the size of the block. The key is shifted by said number of bits prior to a subsequent stage of the search. Part of the memory comprises an associated data table which includes entries of data enabling a packet to be forwarded and at least some locations in said blocks provide when accessed a pointer to an entry in the associated data table.

10 Claims, 4 Drawing Sheets

COMMUNICATION DEVICE WITH FORWARDING DATABASE HAVING A TRIE SEARCH FACILITY

BACKGROUND TO THE INVENTION

This invention relates to communication devices for packet-based communication systems, and in particular to multi-port communication devices which receive addressed data packets at any of a multiplicity of ports and which can forward packets to one or more ports after recourse to a forwarding database which includes entries identifiable from a destination address and including associated data such as, for example, a port mask.

Background to the Invention

Multi-port communication devices for packet-based communication systems, such as 'layer 3' switches and routers, usually include a forwarding database by means of which a received packet is directed, after appropriate processing and temporary storage as necessary or appropriate, to one or more ports of the device. The forwarding database may be established from information obtained from routing and address resolution protocols.

When a packet is received and is therefore to be forwarded by the device, the destination address may be looked up in the forwarding database. There is a variety of ways of organising such a database in the look up process, in order to economize on the fast random access memory that is required and to reduce the searching time or both. For example, one method of retrieval includes the hashing of an address to provide access to a table of hashed addresses, this table having entries constituting pointers to a data table including address data and associated data. It is known to organise these databases such that the entries in the data table which share a common hashed address are linked, it being necessary to verify the entries in the data table in turn against the key, or address for which the search is made, and to proceed along the chain of linked addresses until a verified match is found. A database organised on these lines is disclosed in U.S. patent application Ser. No. 09/286,469 filed 6 Apr. 1999 in the name Anne G O'Connell and incorporated by reference herein.

There are circumstances in which despite such space saving schemes as hashing, a forwarding database is liable to contain a very large number of addresses and consequently would require a very large memory. One example is if a switch is used as a 'layer 3' device, namely it is required to look up addresses which pertain to layer 3 (logical link control) of the OSI model, these addresses are otherwise known as 'network' addresses.

It is known to employ a 'trie' system for the forwarding database. The purpose of a 'trie' scheme is to determine the 'next hop' for a packet on a route to its final destination. It will be understood that a router which operates on network addresses is indirectly connected (by way of other routers) to a large number of end stations and, in the absence of some more efficient scheme for storing addresses, would need to store the MAC addresses of all that large number of end stations (in addition to the MAC addresses of the end stations to which it may be directly connected). However, many packets having different network addresses will require to be sent to the same router and therefore, as far as the search is concerned may be treated as having the same address (whether this be expressed as a port number or as the MAC address of the next router). The address data for forwarding packets to the next (intermediate) destination can be collapsed into a single entry in a routing table.

It is therefore convenient to divide a forwarding database, particularly for a router or other layer 3 switch, into generally two parts. One part comprises a set of blocks each of which contains a plurality of storage locations each including (in the simplest case) a pointer 'result' field. The rest of the database comprises 'associated data' entries, such as a port number and/or a MAC address. If the 'result'0 field of a pointer is not set, the pointer will identify another trie block. If it is set it will point to an entry in the associated data table part of the database. Many packets may have the same 'next hop' and accordingly the information for the address data of these packets can be collapsed into a single entry in the routing table. The address look up is performed using a key comprising the layer 3 address information. The key may be used to search a trie data structure until a leaf node, namely an associated data block is found. Each level in the trie employs a successive group of bits from the key. The benefit of such a searching scheme is that many addresses with a common prefix can refer to the same target address When a trie structure is established, the amount of memory allotted to it in the database is divided into blocks. The number of blocks determines the number of routes which may be stored. If only a small number of blocks is available, then the number of routes that can be stored is also small. It is possible to increase the number of routes stored by sub-dividing the same memory space into smaller trie blocks. Using smaller blocks in the trie system has the disadvantage that the search time may be increased, thereby reducing the performance of the look up process. Maximum versatility can be achieved by supporting blocks of different sizes. Initially, the tables can then be built using larger trie blocks, maximizing look up performance. If the memory configuration does not allow sufficient routes to be stored, the tables can be configured to use smaller trie blocks with some loss of look up performance.

However, if blocks of different sizes are to be used, a problem arises over the selection of the correct number of address bits for use in each stage of the trie search. The multiplexing required to select different numbers of address bits at each stage would become very complex, the complexity increasing as the number of block sizes increases.

SUMMARY OF THE INVENTION

The invention has as its main object the provision of a device with a trie search facility that is provided in hardware and which accommodates a multiplicity of block sizes for the trie search.

The invention is based on the use of a shift register to hold the key for the trie search, and at each stage of the search to shift the content of the register by the number of bits employed for accessing a location within a block. The result of each stage of a search is a pointer to a block, the pointer identifying the block and also including an indication, which denotes the size of the block to which the pointer refers. This indication in the pointer can be used to control the shift register. Preferably the indication is a coded indication, i.e. it merely distinguishes between the possible sizes of blocks. Thus it may be constituted by a one-bit field if there are only two possible sizes and a two-bit field if there are four possible sizes. Herein 'size' refers to the number of different pointers that can be accessed and not necessarily the number of locations, since each location may be used for storing a plurality of pointers.

Reference will hereinafter be made to the accompanying drawings, which illustrate schematically one embodiment of the invention.

DETAILED DESCRIPTION

The present invention is intended in its preferred form to be implemented in a router, or network device able to perform a routing function, that is to say to obtain from-a packet its 'IP' or layer 3 destination address and by means of a forwarding database to select a route to the device identified by the layer 3 address. This route may be expressed as the next hop, i.e. it requires a MAC address or port number to be obtained, using the network address as a key, from the forwarding database. The architecture of the device in which the invention is to be incorporated is not important and there are many proprietary network devices which are quite adequate for hosting a trie search facility according to the invention.

Figure 1:
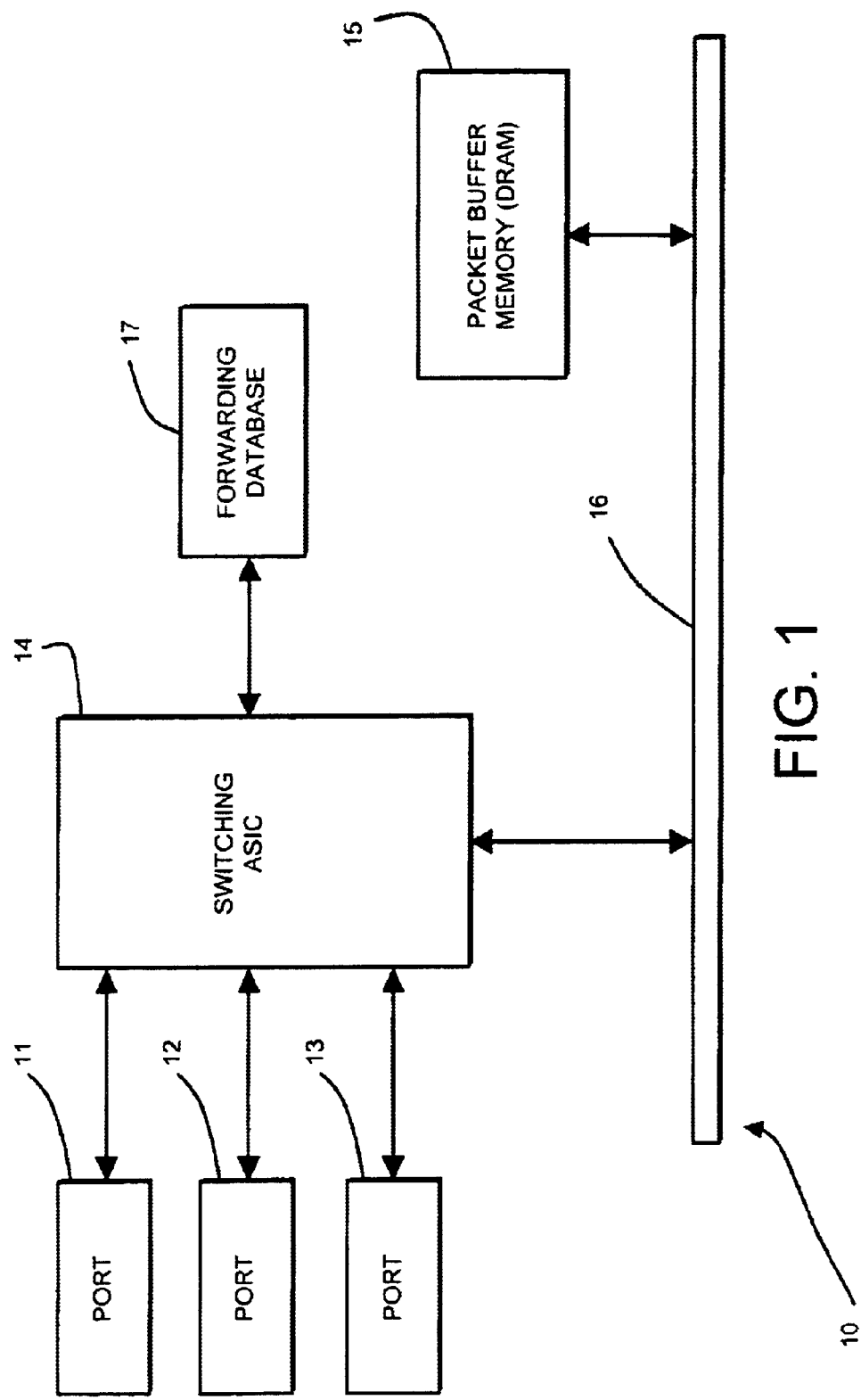
FIG. 1 is a schematic illustration of a known form of network device.

FIG. 1 illustrates in simplified schematic form only a network device which can be used as a host for the present invention. In common with most other network devices, the device 10 includes a multiplicity of ports. For the sake of simplicity, only three ports, 11, 12 and 13 are shown. Such ports are commonly organised so that they have a receive path and a transmit path so that they can both receive packets from a device to which the respective port is connected and send packets from that port. The packet reading, encapsulation and switchinp functions are coma only per formed in an ASIC (application-specification-integrated Circuit) 14 which can direct receive packets to a packet buffer 15, preferably but not necessarily implemented in dynamic random access memory. Packets reach the packet buffer by way of a bus 16. Also s how n in FIG. 1 is a forwarding database 17 which, as is well known and as previously indicated, is used to determine a route that a packet should take in order to get to the required destination.

The forwarding database (or 'routing table') is established according to known techniques using appropriate address resolution protocols. This is beyond the scope of the present invention and will not be described further.

Figure 2:
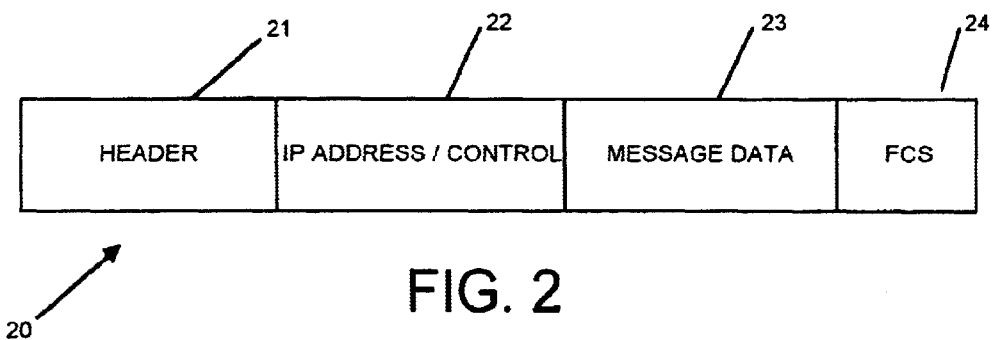
FIG. 2 is a simplified illustration of a data packet.

FIG. 2 illustrates in simplified terms an Ethernet data packet of th e kind employed in a communication network system in which a network device according to the invention would form part. It is not intended to be a detailed illustration of a packet, which is fully described in any of the publications relevant to the known transmission standards. Typically, a packet 20 comprises a header 21, which may include the MAC addresses of the immediate source and destination of the packet, a segment which includes IP address data and other control data of no consequence to the present invention, message data 23 and frame check sum or cyclic redundancy code data which is generated employing the data content of the packet and some generating functions.

Figure 3:
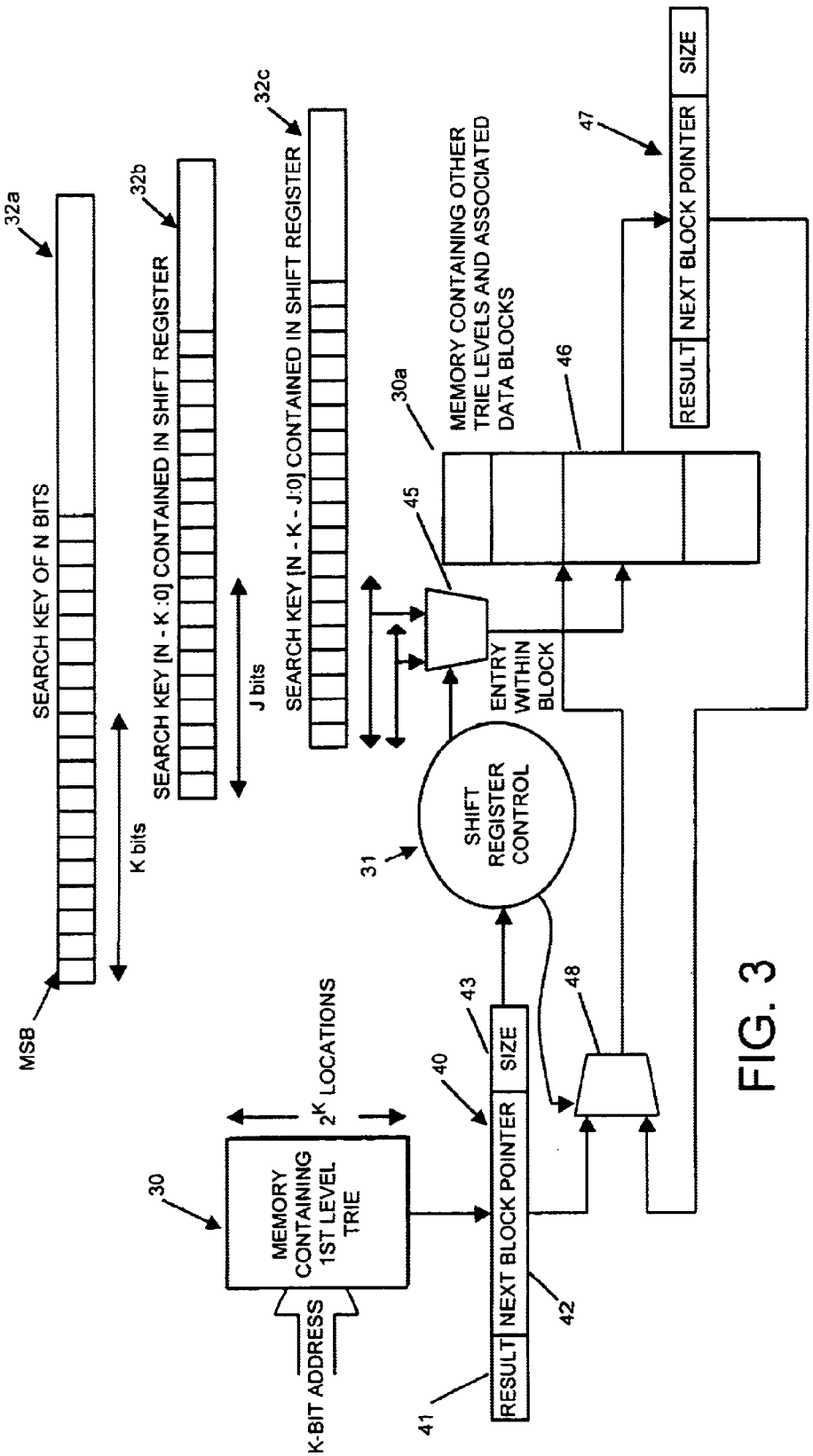
FIG. 3 is a schematic drawing illustrating the performance of a trie search according to the invention.

FIG. 3 illustrates schematically t he main hardware elements of a search facility according to th e invention. It comprises a memory 30, which is organised as described hereinafter, a shift register control 31, and a shift register shown in three phases, 32a–32c, illustrating an initial phase 32a when as search key is loaded and two later phases. In each cycle of operation, a selected number of bits, starting with the most significant bit, of the key access the memory 3). The result is a pointer which, among other things, defines the number of bits used in the next stage of the search. The control 31 responds to this pointer by shifting the keyword held in the shift register by the number of bits employed in the current stage of search and selects the number of bits to be employed in the next stage, as will be described in more detail in what follows.

The search key, constituted by the 'network address' representing the destination of a packet which is to be forwarded from the device, is written into the shift register in phase 32a. It is presumed that the search key can have a maximum of N bits, the search register having at least this number of bit positions and the search key being written into the shift register with the most significant bit (MSB) first. The first probe into the forwarding database is into a block which is fixed in size and is therefore accessed by a fixed number of address bits. It will be assumed that this number of bits is K bits. The address is generated by using the appropriate number (K) of bits from the key. When the result of the first read of the memory is returned, the shift register control 31 shifts the key to the left by the same, fixed, number (K) of bits.

The result of the first read operation is a pointer 40 which includes a (one bit) 'result' field 41. If this field is set (i.e. is '1') the address data 42 in the pointer points to an entry in the associated data table. If the result field is not set the pointer points to another trie block. In the latter case the pointer includes address data 42 to identify the next trie block and an indication, which may be constituted by a single or multi-bit field 43, of the size of the block to which the pointer points. In the present example it will be assumed that the memory employs blocks of two different sizes, 32 bytes or 256 bytes. If the block size is 32 bytes (containing eight locations each 32 bits wide, with two pointers in each location) then the next three bits of the key are used to index into the correct location-within that block and a fourth bit to select the upper or lower bits in that location, to obtain the correct pointer. If the block size is 256 bytes, with 32 locations each 32 bits wide and two pointers per location, the next seven bits of the key are required to select a unique pointer. This scheme requires only a single multiplexer 45 to select either the next four or seven most significant bits of the remaining portion of the key from the same fixed location (the top seven bits) within the shift register.

When the pointer accessed by the combination of the block pointer and the relevant number of bits from the key is read the result is a pointer for yet another block and the shift register for the key must again be shifted to the left by either four or seven bits, depending on how many bits were used.

FIG. 3 shows pointer 40 pointing to a block 46 which is accessed (to obtain the next pointer) by shifted key 32b. This block is shown as part of memory space 30a which could be part of memory 30 but which may be provided 'off-chip' whereas memory 30 may be 'on-chip'.

The search will continue using the next pointer 47 until the required route or next hop has been found. Depending on how the address is stored in memory, this may mean that the entire key has not to be used before the answer is found.

In order to support more than two different block sizes, the number of bits in the trie pointer must be increased. For example, to support four different block sizes, containing for example 16, 32, 64 and 128 pointers respectively, the block size field in the block pointer requires at least two bits to indicate the size of the next block. This is shown in the Figure, wherein the size field consists of a two bit field 43 to enable the shift register control to provide the shift of the corresponding number of bits and to control a multiplexer 45 to select the respective number of bits from the uppermost seven bits of the shift register.

If for example the first stage pointers are stored in 'on-chip' memory 30 to speed up the search and all further stage pointers are stored in 'off-chip' memory, a further multiplexer 48 may be provided to enable a choice between a pointer coming from memory on the chip or a pointer coming from memory 30a which is 'off-chip'.

The memory may be organised differently, with only one pointer per memory location but the same principles apply. In such a variation the size of the memory in terms of pointers would be equal to the size in number of locations.

Figure 4:
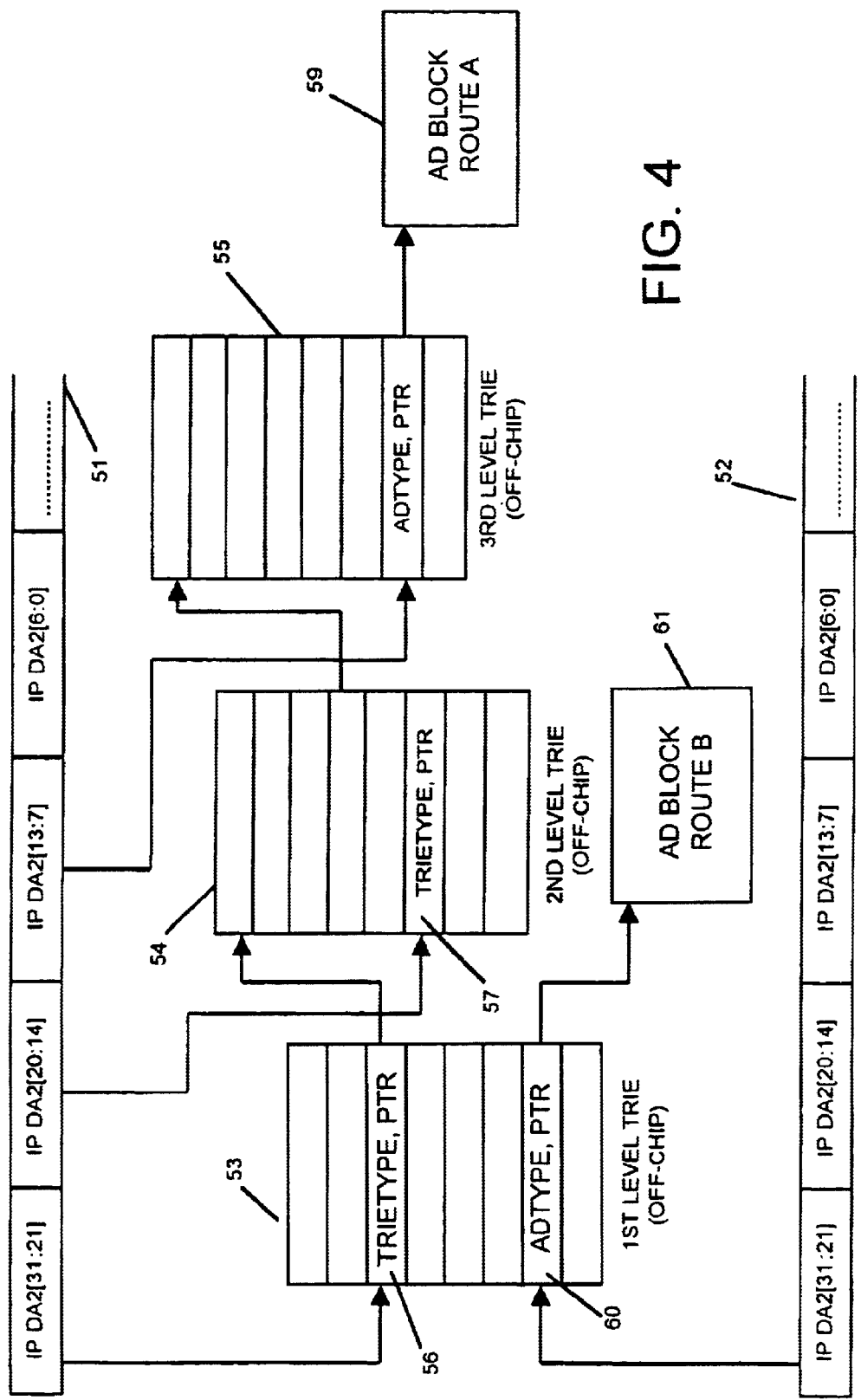
FIG. 4 is a further illustration of a trie search according to the invention.

FIG. 4 illustrates two trie searches which are performed in response to two network address keys shown at 51 and 52 respectively. The searches are conducted through blocks 53, 54 and 55 which are of a different size. Block 53 requires eleven bits for access, namely bits 31 to 21 of a keyword. The second block 54 requires seven bits, as does the third block 55.

FIG. 4 shows the search process performed in response to the key 51. Access to the first block requires the first eleven bits [31:21] of the IP destination address (key) 51 and identifies a trie type pointer 56, which points to block 54 and determines a block size of seven bits. The second stage of the search identifies a specific pointer 57 within block 54. This is again a trie type pointer which points to block 55. The third stage of a search finds a destination pointer 58 which points to an associated data block 59 identifying a route A to the destination.

In contrast, the search made using the first eleven bits of key 52 identifies in block 53 a pointer 60 of which the result field is set. Thus this pointer will identify an entry in an 'associated data' block 61, this entry defining the next hop on which the packet containing the IP address key 52 should be sent in the first block 53, pointing to an associated route A shown at 54.

What is claimed is:

1. A communication device for a packet-based communication system wherein each packet comprises address data, the communication device including a multi-stage trie search system comprising:

a memory;

means for accessing at least part of the memory in blocks, each of said blocks comprising a multiplicity of locations and said blocks including blocks of at least two different sizes, at least some of said locations each providing when accessed a pointer to another block and an indication of the respective size of that block;

a shift register for holding an address key; and means for accessing said another block using an address composed of a number of bits related to said indication of the respective size of the block and for shifting said key by said number of bits prior to a subsequent stage of the search.

2. A device according to claim 1 wherein said indication of the size of the block is a coded indication of the number of accessible pointers and accordingly the number of bits required to identify a pointer within a respective block.

3. A device according to claim 1, wherein a first stage of the trie search is in a block of a predetermined size and the key in the shift register is shifted by a number of bits corresponding to that predetermined size in preparation for a second stage of the trie search.

4. A device according to claim 1 wherein part of the memory comprises an associated data table which includes entries of data enabling a packet to be forwarded and wherein at least some locations in said blocks provide when accessed a pointer to an entry in the associated data table.

5. A method of performing a search in a database in a device for use in a packet-based communication system, said database being organised in a multiplicity of blocks, a first plurality of blocks containing entries composed of pointers to other blocks and a second plurality of said blocks containing entries defining a route for a packet, the blocks in said first plurality being of different sizes, said method comprising at each stage of searching.

(i) employing a first plurality of bits of a search key to access a first block and identify a respective pointer therein, said respective pointer containing a result field, an address field and a size field, and (ii) when said result field has a particular value, employing a second plurality of bits all subsequent to said first plurality of bits to access a second block in the first plurality of blocks, said size field indicating the number of bits in said second plurality of bits.

6. A method according to claim 5 and further comprising, when said first result field has a predetermined value different from said particular value, employing said respective pointer to access a block in said second plurality of blocks.

7. A multi-stage trie search system comprising:

a memory;

means for accessing at least part of the memory in blocks, each of said blocks comprising a selectable multiplicity of locations whereby said blocks can include blocks of at least two different sizes in terms of said locations, at least some of said locations in each block each providing when accessed a pointer to another block and a coded indication of the number of accessible pointers in said another block;

a shift register for holding an address key; and means for accessing said another block using an address composed of a number of bits related to said coded indication of the respective size of the block and for shifting said key by said number of bits prior to a subsequent stage of the search.

8. A device according to claim 7, wherein said coded indication indicates the number of bits required to identify a pointer within said another block.

9. A method for performing a multi-stage trie search comprising:

accessing at least part of a memory in blocks, each of said blocks comprising a multiplicity of locations, said blocks including blocks of different sizes, at least some of said locations in each block providing, when accessed, a pointer to another block and an indication of the size of that block;

holding an address key in a shift register; and accessing said another block using an address composed of a number of bits related to the indication of the size of the block and for shifting said key by said number of bits prior to a subsequent stage of the search.

10. A multi-stage trie search method comprising:

accessing at least part of a memory in blocks, each of said blocks comprising a selectable multiplicity of locations whereby said blocks can include blocks of at least two different sizes in terms of said locations, at least some of said locations in each block providing, when accessed, a pointer to another block and a coded indication of the number of accessible pointers in said another block;

holding an address key in a shift register; and accessing said another block using an address composed of a number of bits related to said coded indication of the size of the block and for shifting said key by said number of bits prior to a subsequent stage of the search.

* * * * *